July 16, 1935. H. R. PATTERSON 2,008,466
BRUSH MOUNTING FOR DYNAMO-ELECTRIC MACHINES
Filed May 26, 1933
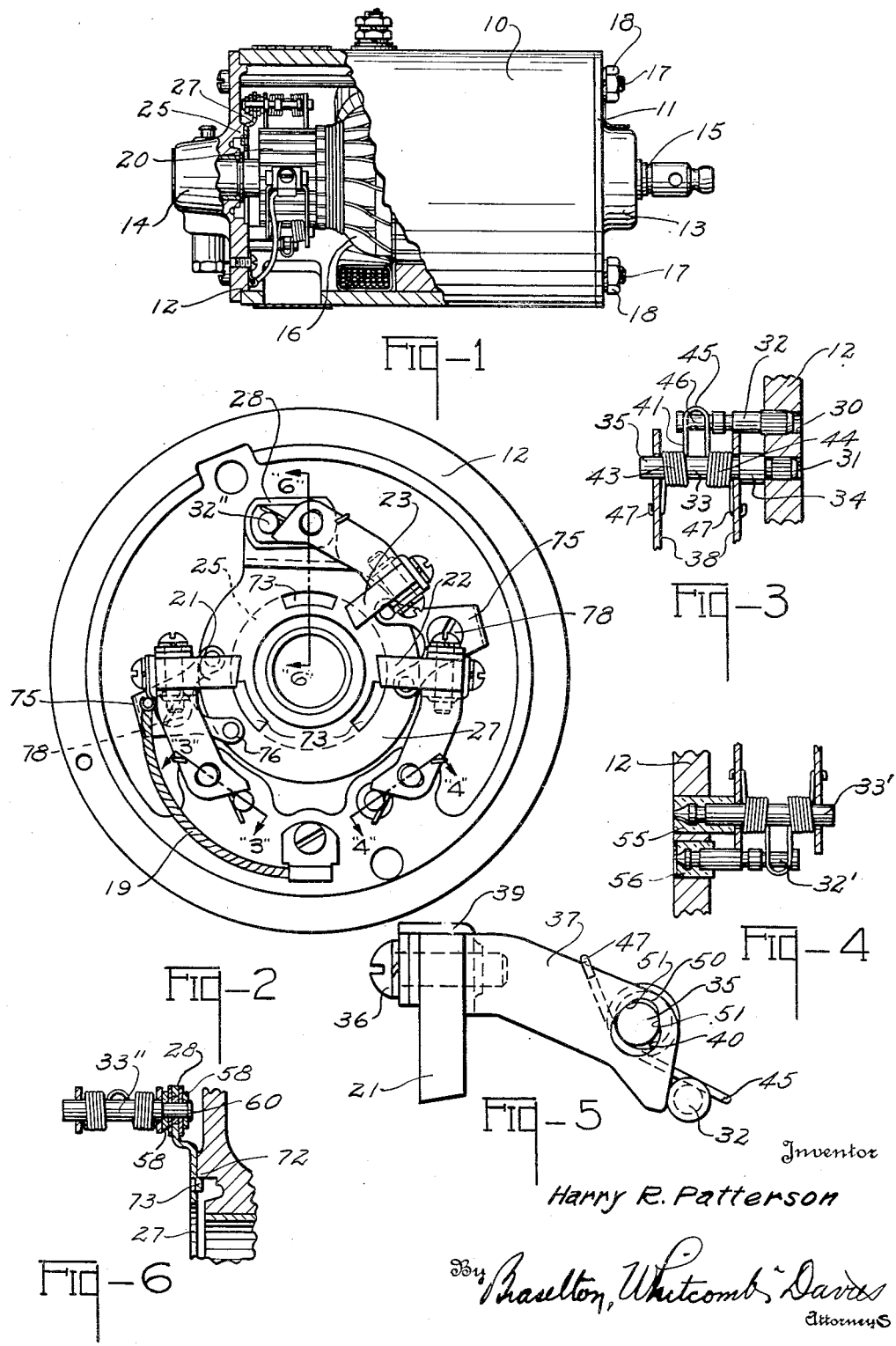
Inventor
Harry R. Patterson
By Braselton, Whitcomb & Davis
Attorneys Patented July 16, 1935

2,008,466

UNITED STATES PATENT OFFICE 2,008,466

BRUSH MOUNTING FOR DYNAMO-ELECTRIC MACHINES

Harry R. Patterson, Toledo, Ohio, assignor to The Electric Auto-Lite Company, Toledo, Ohio, a corporation of Ohio Application May 26, 1933, Serial No. 672,921

11 Claims. (Cl. 171—324)

This invention relates to electrical apparatus and more particularly to brush supporting structures for use with dynamo electric machines commonly employed as part of the electrical equipment of motor vehicles.

It is one of the principal objects of this invention to provide a combined end frame structure for dynamo electric machines having a brush supporting member of novel construction.

Another object is the provision of a combined brush holder support and bearing for the armature shaft of a dynamo electric machine. Another object of this invention is to provide an improved brush holder mounting simple and compact in construction which permits the ready assembly and easy adjustment of the brush holder bracket relative to the end frame construction.

A further object of this invention is to provide a brush holder mounting such that one of the brush holders can be adjusted relative to the other.

Another object is the provision of a brush holder construction wherein the brush bracket is pivotally mounted and so constructed that obnoxious hums or brush noises are eliminated.

The invention also contemplates the provision of means associated with the brush structure, an end frame construction whereby the brush holder or bracket will be prevented from pressing against the commutator in case the brush becomes broken or when the brush holder bracket reaches a predetermined position and this means includes means to stop the angular position of the brush bracket with respect to the commutator.

The invention comprehends the provision of a construction of this character where certain parts are made of sheet metal and capable of being manufactured and assembled in large quantities without the use of special tools, as well as to facilitate interchangeability of parts for purpose of replacement or repair.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of certain forms of the invention, which may be preferred, in which:

Figure 1 is a side elevational view of the dynamo electric machine embodying my invention with certain parts broken away;

Figure 2 is an enlarged detailed view of the combined brush support structure and end frame construction embodying the invention;

Figure 3 is a fragmentary detailed sectional view taken substantially on the line 3—3 of Figure 2;

Figure 4 is a fragmentary detailed sectional view taken substantially on the line 4—4 of Figure 2;

Figure 5 is an enlarged detailed view showing the brush holder mounting and means for limiting the angular movement;

Figure 6 is a detailed sectional view taken substantially on line 6—6 of Figure 2.

I have shown the arrangement of my invention as incorporated in a dynamo-electric machine of the type commonly employed for use in automotive vehicle constructions, but it is to be understood that my invention is susceptible of other uses and that I contemplate its utilization in any arrangement wherever the same may be found to be applicable.

Referring to the drawing in detail, Figure 1 illustrates an embodiment of my invention in a generator which includes a housing 10 having end plate closures 11 and 12, the end plates 11 and 12 are provided with portions 13 and 14 accommodating bearings for supporting a shaft 15 which in turn carries the armature 16. The plates 11 and 12 are preferably held in place on the generator casing by suitable means as, for example, studs 17 which extend throughout the length of the casing 10, and receive retaining nuts 18, thus holding these parts in assembled relation.

As particularly illustrated in Figures 1 and 2, the end plate 12 is formed to carry or support a plurality of brushes for engagement with the commutator 20. The generator illustrated is of the so-called third brush type having two main brushes 21 and 22 and an adjustable third brush 23, the position of the latter brush upon the commutator 20 determining the general characteristics of the generator.

In the arrangement illustrated, the plate 12 is provided with a centrally positioned flange 25 upon which is movably, yet snugly, fitted plate 27 having radial projection 28 adapted to support a brush carrying structure for the brush 23.

In the particular generator construction illustrated, the brush supporting structure for main brush 22 is insulated as will be described, and brush supporting structure for main brush 21 is not insulated, but is grounded through cable 19, while the brush supporting structure for the third brush 23 is insulated from carrying plate 27. The brush holder structures carrying the main brushes 21 and 22 are substantially the same as the structure carrying the third brush 23 and therefore only one structure will be described in detail.

The mounting for the brush 21 and supporting parts is particularly illustrated in Figure 3, in which two openings 30 and 31 are made in the end plate 12 to accommodate pins or stud shafts 32 and 33, the ends of the pins being knurled to insure snug fit of the pins in plate 12. The shaft 33 is provided with a shoulder portion 34 and a cylindrical tenon portion 35, the latter accommodating the brush holder frame 37, preferably of thin or sheet material, the latter being substantially of U-shaped configuration, the adjacent parallel legs 38 of which are provided with openings 40 as illustrated in Figure 5 for mounting upon the cylindrical tenon 35. The brush is carried at the bight of the brush holder structure, the latter being provided with a threaded opening to receive the brush retaining screw 36, structure 37 being provided with an integral lip or lug portion 39 which acts as a seat for the brush 21. A resilient member or spring 41 is provided for urging the brush holder and brush carried thereby into engagement with the commutator of the dynamo-electric machine. This spring preferably comprises two sets of juxtaposed coil portions 43 and 44 spaced apart and preferably formed of one piece of wire, the loop joining the two sets of coils of the spring, as indicated at 45, being in engagement with a reduced portion 46 of stop pin 32, the free ends of the wire making up the spring 41 being turned outwardly at their extremities 47 and engaging the legs 38 of the brush holder structure per se. As will be seen from an examination of Figure 5, the spring 41 is constructed and connected to the brush holder 37 and the stop pin 32 in such a manner that the spring is under tension tending to rotate the brush holder 37 in a counterclockwise direction around the pivot pin or stud shaft 33 as the axis which tendency to rotation moves the brush 21 into resilient engagement with the commutator.

A feature of this invention resides in the manner of mounting the movable brush carrying member with respect to its support, so that a particular co-action is present between the brush supporting member and said support so that obnoxious hums or squeaks are eliminated. As a practical application of the invention, the movable brush supporting member 37 is provided with an opening 40 of particular configuration having certain surfaces in intimate contact with the pivot pin 33. An examination of Figure 5 of the drawing showing one form of the invention discloses the cylindrical portion of the opening 40 being of larger diameter than the diameter of pin 33, a second partial cylindrical portion of the opening 50 of lesser diameter than that of pin 33 and substantial tangential walls 51 joining the walls of the partial cylindrical openings. The inherent resiliency or tension in spring 41 urges the brush holder 37 to a position in which the periphery of the pivot pin 33 engages with the straight or tangential walls 51 of the opening 40 engaging the periphery of the pin. In effect the pin rests in a V-shaped opening, affording a line contact between the movable brush carrying member and its support, the spring 41 being under tension urging the brush holder into intimate contact with its support, without excessive pressure of the brush upon the commutator thereby reducing brush wear. This construction eliminates any tendency of the brush holder to tilt or to change its position relative to the supporting pin as it is at all times urged by means of the spring 41 into a predetermined position which prevents tilting or sidewise movement of the brush with respect to the commutator. It has been found that through the use of a construction of this nature, the consequent wear and any sparking of the commutator and brush is proportionately decreased by reason of the full area or line of contact being had at all times between the surfaces of the brush and commutator, and at the same time brush noises, as for example, humming and squeaking and the like, are substantially reduced or eliminated.

In the embodiment illustrated, the supporting mounting for each of the three brush carrying or supporting structures is substantially the same. The method of mounting the pivot and stop pins carrying the brush structure 22 is modified in that the pivot pin 33' and stop pin 32' are insulatingly supported upon the plate 12 by means of insulating bushings 55 and 56, as particularly illustrated in Figure 4.

The movable third brush 23 and its supporting structure comprising the pivot pin 33'' and the stop pin 32'' are insulatingly supported upon the projections 28 formed upon the movable ring 27. In this form of mounting a series of washers of insulating material 58 are interposed between a reduced portion of the pin 32' and an opening in the projection 28 so as to completely insulate the brush and supporting structure from the brush holder ring 27, the end or pivot pin 33'' being swaged over as at 60 to fixedly retain the supporting pin upon the projection 28.

In order to maintain the movable brush 23 concentric with the commutator, the end plate 12 is provided with a shoulder 72 concentric with the axis of the journal bearing to receive the armature shaft 15, the brush holder plate 27 being provided with struck-up portions 73 forming a multilated concentrically arranged flange snugly engageable with shoulder 72 thus assuring that adjustment of the third or movable brush 23 will always be in a path concentric with the axis of the armature shaft. As particularly illustrated in Figure 2, the movable ring 27 is maintained in its adjustable position by frictional means consisting in the embodiment shown of spring clips 75 having portions 76 frictionally engageable with a surface of ring 27, the clips being held in place by means of screws 78 threaded into the end plate 12. In other respects, means for supporting the brush holder and brush are the same as illustrated in Figure 5 and as hereinbefore described.

It is apparent that, within the scope of the invention, modifications and different arrangements may be made other than is herein disclosed, and the present disclosure is illustrative merely, the invention comprehending all variations thereof.

What I claim is:—

1. In a device of the character disclosed, in combination, a plate; a supporting element carried by said plate; a member having closed slots provided with spaced non-circular wall portions, said supporting element projecting through and contacting with spaced portions of the non-circular walls of said slots; and means for urging said member into predetermined position with respect to said supporting element.

2. In a device of the character disclosed, in combination, a plate; a supporting element fixed to said plate; a member having a plurality of arms having aligned closed slots formed with angularly arranged spaced wall portions, said supporting element projecting through and contacting with spaced portions of the walls of said slots; and resilient means for urging said member into predetermined position with respect to said supporting element.

3. In a device of the character disclosed, in combination, a supporting element; a bracket supported upon said element, said bracket having projecting portions provided with openings having converging walls, portions of said supporting element projecting through and contacting with the converging walls of said openings defining the position of said bracket with respect to the supporting element; and resilient means for urging said bracket into defined position with respect to said supporting member.

4. In a device of the character disclosed, in combination, a plate; a supporting element fixed to the plate; a bracket supported upon said element, said bracket having projecting leg portions provided with openings having converging walls, said supporting element projecting through and contacting with the converging walls of said openings defining the position of said bracket with respect to the supporting element; and a coil spring for urging said bracket into defined position with respect to said supporting member.

5. In a device of the character disclosed, in combination, a supporting element; a member movable relative to said supporting element having non-circular openings formed with opposed converging walls, said supporting element having portions projecting through and contacting with the opposed walls of said openings; resilient means encircling the projecting portions of said support for urging said member into predetermined position with respect to said supporting element; and stop means for limiting the range of movement of said member.

6. In a device of the character disclosed, in combination, a plate; a stub shaft of cylindrical contour projecting from said plate; a bracket formed with projecting portions, said projecting portions being provided with aligned non-circular openings having converging walls, the converging walls contacting with the cylindrical portion of said shaft for defining the relative position of the parts; and a spring engageable with said bracket and the shaft for urging the bracket to its defined position.

7. In a device of the character disclosed, in combination, a plate; a supporting element fixed to the plate; a brush; a bracket supported upon said element having means to position and retain said brush, said bracket having portions provided with openings having converging walls, said supporting member having portions projecting through and contacting with the converging walls of said openings defining the position of said bracket with respect to the supporting element; and a spring for urging said bracket and brush into defined position with respect to said supporting member.

8. In combination, an end plate for dynamo-electric machines having a pin projecting therefrom; a brush holder pivotally supported upon said pin, said brush holder being of U-shaped configuration and having a projecting lug adjacent its bight portion adapted to receive and position a brush; means for securing the brush to said holder, said brush holder having aligned openings formed with converging walls engageable with the supporting pin; and resilient means for urging said brush holder into predetermined pivotal relationship with respect to said pin.

9. The combination of a dynamo-electric machine having a frame and an armature and commutator having a shaft projecting therefrom; a brush coacting with said commutator; a brush holder pivotally supported upon a pin carried by said frame, said brush holder being of U-shaped configuration, having a projecting lug adjacent its bight portion adapted to receive and position said brush; means for securing said brush to said holder, said brush holder having aligned openings formed with converging walls engageable with the pin; and resilient means for urging said brush holder into predetermined pivotal relationship with respect to said commutator.

10. A brush supporting structure for dynamo-electric machines including a support having a pivot member projecting therefrom; the brush holder comprising a U-shaped member; means formed adjacent the bight portion of the U-shaped member for positioning and retaining a brush structure, the projecting leg portions being formed with slots having converging walls for engagement with the pivot member.

11. A brush supporting structure for dynamo-electric machines comprising a plate; a pivot pin carried by said plate; a U-shaped member; means formed adjacent the bight portion of the U-shaped member for positioning a brush structure; means formed on said member for receiving brush retaining means, the projecting legs of said U-shaped member having openings therein to receive and accommodate said pin, the walls of said openings being shaped to provide a two-line contact with said pin; and a resilient member encircling said pin for applying pressure in one direction to said U-shaped member.

HARRY R. PATTERSON.